(12) United States Patent
Ishikawa et al.

(10) Patent No.: US 6,251,041 B1
(45) Date of Patent: Jun. 26, 2001

(54) TOROIDAL TYPE CONTINUOUSLY VARIABLE TRANSMISSION

(75) Inventors: Kouji Ishikawa; Seiji Higuchi; Nobuo Goto; Takashi Imanishi, all of Kanagawa (JP)

(73) Assignee: NSK Ltd., Kanagawa (JP)

(*) Notice: Subject to any disclaimer, the term of this patent is extended or adjusted under 35 U.S.C. 154(b) by 0 days.

(21) Appl. No.: 09/329,219

(22) Filed: Jun. 10, 1999

(30) Foreign Application Priority Data

Jun. 11, 1998 (JP) .................................................. 10-163633

(51) Int. Cl.[7] .................................................. F16H 15/38
(52) U.S. Cl. .................................................. 476/40; 384/625
(58) Field of Search .................................................. 476/40, 46, 39; 384/625

(56) References Cited

U.S. PATENT DOCUMENTS

| | | | |
|---|---|---|---|
| 4,955,246 | 9/1990 | Nakano | 74/200 |
| 5,547,432 | 8/1996 | Imanishi et al. | 476/40 |
| 5,556,348 * | 9/1996 | Kokubu et al. | 476/40 |
| 5,630,668 * | 5/1997 | Ikezawa et al. | 384/527 |
| 5,720,689 | 2/1998 | Imanishi et al. | 476/40 |
| 5,855,531 * | 1/1999 | Mitamura et al. | 476/46 |
| 5,951,435 * | 9/1999 | Imanishi et al. | 476/46 |

FOREIGN PATENT DOCUMENTS

| | | | |
|---|---|---|---|
| 6-37223 | 9/1994 | (JP) | F16H/15/38 |
| 6-41004 | 10/1994 | (JP) | F16H/15/38 |
| 7-208569 | 8/1995 | (JP) | F16H/15/38 |
| 8-240251 | 9/1996 | (JP) | F16H/15/38 |
| 8-240252 | 9/1996 | (JP) | F16H/15/38 |
| 10-227346 | 8/1998 | (JP) | F16H/15/38 |

\* cited by examiner

*Primary Examiner*—Sherry Estremsky
*Assistant Examiner*—Tisha D. Lewis
(74) *Attorney, Agent, or Firm*—Sughrue, Mion, Zinn, Macpeak & Seas, PLLC (57) ABSTRACT

The toroidal type continuously variable transmission includes: first and second disks concentrically disposed on each other and supported such that they can be rotated freely; a pair of trunnions; a pair of displacement shafts respectively including support shaft portions and pivot shaft portions; a plurality of power rollers interposed between and held by the first and second disks; a plurality of thrust ball bearings respectively for supporting their associated power rollers; and, a plurality of thrust needle bearings respectively interposed between the outer surfaces of outer rings respectively forming the thrust ball bearings and the inner surfaces of the trunnions. A retainer for retaining the thrust needle roller in a freely rollable manner is formed of a single plate, and is carbonitrided, while the surface hardness Hv of the retainer is set higher than or equal to 550.

3 Claims, 8 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission and, in particular, to a toroidal type continuously variable transmission for use in a vehicle or various industrial machines.

2. Description of the Related Art

Figure 1:
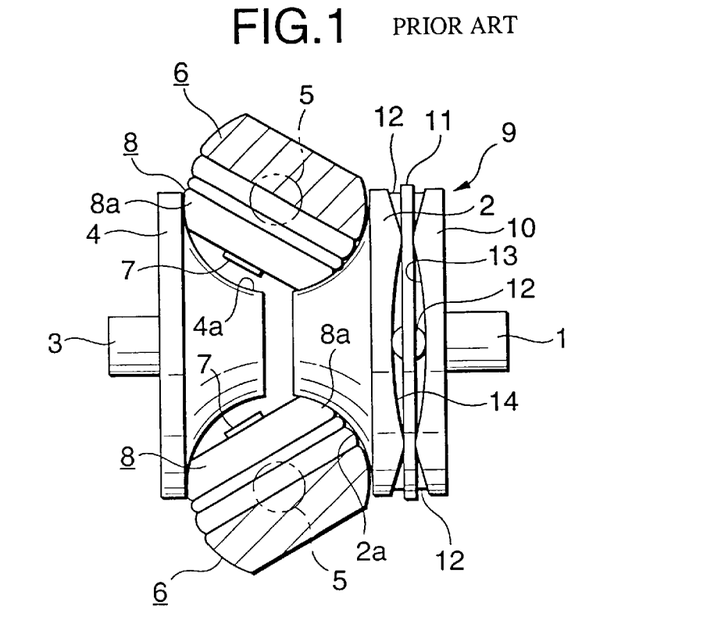
FIG. 1 is a side view of the basic structure of a related toroidal type continuously variable transmission, showing its maximum decelerating state thereof.
Figure 2:
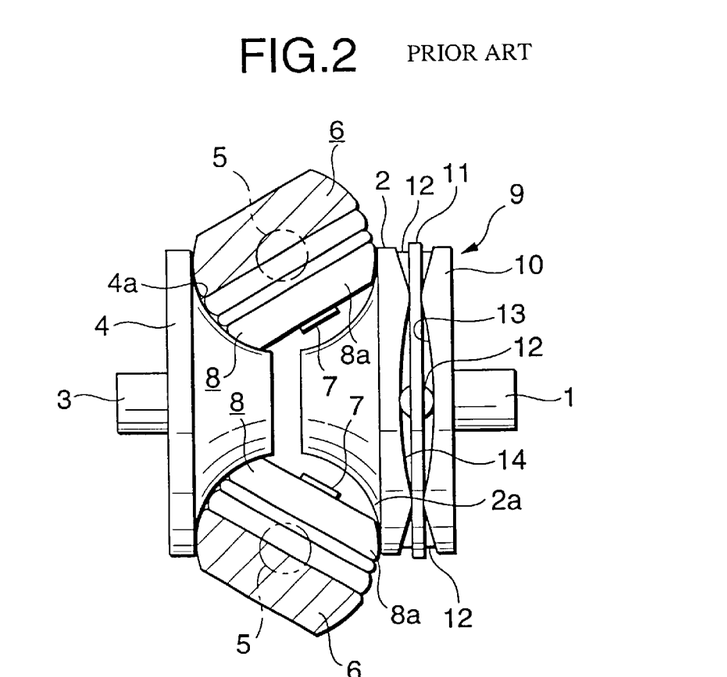
FIG. 2 is a side view of the basic structure of the related toroidal type continuously variable transmission, showing its maximum accelerating state thereof.

Conventionally, as a toroidal type continuously variable transmission, there is known such a structure as shown in FIGS. 1 and 2 (U.S. Pat. No. 5,720,689). Here, FIG. 1 is a side view of a basic structure of a toroidal type continuously variable transmission, showing a maximum decelerating state thereof. FIG. 2, similarly to FIG. 1, is a side view of a basic structure of a toroidal type continuously variable transmission, showing a maximum accelerating state thereof.

In the above-cited related toroidal type continuously variable transmission, an input-side disk 2 serving as a first disk is supported concentrically with an input shaft 1. In addition, there is fixed an output-side disk 4 serving as a second disk to the end portion of an output shaft 3 disposed concentrically with the input shaft 1. In the inside of a casing in which the toroidal type continuously variable transmission is stored, there are disposed a pair of trunnions 6, 6 which are able to swing about their respective pivot shafts 5, 5 respectively disposed at positions along an imaginary plane that is perpendicular to an imaginary line connecting the respective axes of the input and output shafts 1 and 3, and distanced from the intersection of the imaginary plane and imaginary line. This physical relation is hereinafter referred to as "torsional relation".

The pivot shafts 5, 5 are respectively disposed on the outer side surfaces of the two end portions of the trunnions 6, 6. Also, the base end portions of displacement shafts 7, 7 are respectively supported in the central portions of the trunnions 6, 6 and, if the trunnions 6, 6 are swung about the pivot shafts 5, 5 respectively, the inclination angles of the displacement shafts 7, 7 can be adjusted freely. On the peripheries of the two displacement shafts 7, 7 supported on the two trunnions 6, 6, there are supported a plurality of power rollers 8, 8 respectively in such a manner that they can be rotated freely. And, the power rollers 8, 8 are respectively interposed between the two input- and output-side disks 2 and 4.

The input- and output-side disks 2 and 4 respectively include inner surfaces 2a and 4a which are opposed to each other, while the sections of the mutually opposing inner surfaces 2a and 4a are formed as concave surfaces which can be obtained by rotating an arc having the pivot shaft 5 as a center thereof. And, the plurality of power rollers 8 and 8 respectively include peripheral surfaces 8a and 8a which are formed as spherical-shaped convex surfaces, while the peripheral surfaces 8a and 8a of the power rollers 8 and 8 are respectively in contact with the inner surfaces 2a and 4a of the input- and output-side disks 2 and 4.

Between the input shaft 1 and input-side disk 2, there is interposed a pressure device 9 of a loading cam type, while the input-side disk 2 is elastically pressed toward the output-side disk 4 by the pressure device 9. The pressure device 9 is composed of a cam plate 10 rotatable together with the input shaft 1, and a plurality of (for example, four pieces of) rollers 12, 12 which are respectively held by a retainer 11.

On one side surface (in FIGS. 1 and 2, on the left side surface) of the cam plate 10, there is formed a cam surface 13 being a curved surface which extends over the circumferential direction of the cam plate 10; and, on the outer surface (in FIGS. 1 and 2, on the right side surface) of the input-side disk 2, there is also formed a similar cam surface 14. And, the rollers 12, 12 are supported in such a manner that they can be freely rotated about their respective shafts which extend in the radial direction with respect to the center of the input shaft 1.

When the above-structured toroidal type continuously variable transmission is in use, if the cam plate 10 is rotated with the rotation of the input shaft 1,,then the plurality of rollers 12, 12 are pressed against the cam surface 14 on the outer surface of the input-side disk 2 by the cam surface 13. As a result of this, the input-side disk 2 is pressed against the plurality of power rollers 8, 8 and, at the same time, the pair of cam surfaces 13 and 14 are pressed against the plurality of rollers 12, 12, so that the input-side disk 2 is rotated. And, the rotation of the input-side disk 2 is transmitted through the plurality of power rollers 8, 8 to the output-side disk 4, so that the output shaft 3 fixed to the output-side disk 4 is rotated.

In a case of changing the rotation speed of the input and output shafts 1 and 3, in particular, at first, when decelerating the rotation speed between the input and output shafts 1 and 3, the trunnions 6, 6 are respectively swung about the pivots 5, 5, and the displacement shafts 7, 7 are respectively inclined so that the peripheral surfaces 8a, 8a of the power rollers 8, 8, as shown in FIG. 1, can be respectively contacted with the portion of the inner surface 2a of the input-side disk 2 located near the center thereof and with the portion of the inner surface 4a of the output-side disk 4 located near the outer periphery thereof.

Also, on the other hand, when accelerating the rotation speed between the input and output shafts 1 and 3, the trunnions 6, 6 are respectively swung about the pivots 5, 5, and the displacement shafts 7, 7 are respectively inclined so that the peripheral surfaces 8a, 8a of the power rollers 8, 8, as shown in FIG. 2, can be respectively contacted with the portion of the inner surface 2a of the input-side disk 2 located near the outer periphery thereof and with the portion of the inner surface 4a of the output-side disk 4 located near the center thereof. By the way, if the inclination angle of the displacement shafts 7, 7 is set in the middle of the inclination angles shown in FIGS. 1 and 2, then there can be obtained an intermediate transmission ratio between the input and output shafts 1 and 3.

Figure 3:
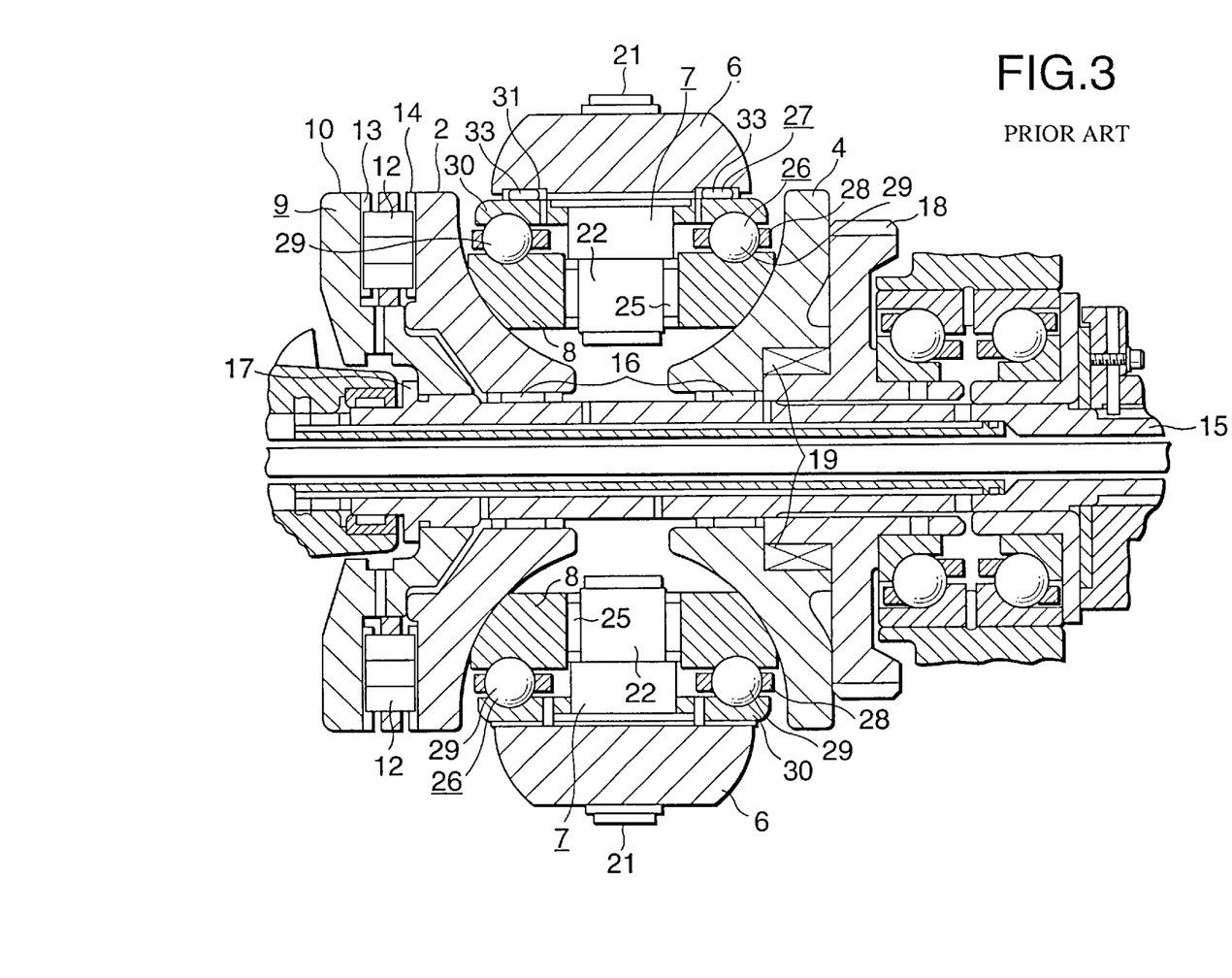
FIG. 3 is a section view of a more specified example of a related toroidal type continuously variable transmission.

Now, FIG. 3 shows a more specified toroidal type continuously variable transmission which is disclosed in U.S. Pat. No. 4,955,246. As shown in FIG. 3, an input-side disk 2 and an output-side disk 4 are rotatably supported on the periphery of a cylindrical input shaft 15 respectively through needle bearings 16 and 16.

Also, a cam plate 10 is spline engaged with the outer peripheral surface of the end portion (in FIG. 3, the left end portion) of the input shaft 15 and is prevented, by a flange portion 17, from moving in a direction away from the input-side disk 2. Further, the cam plate 10 cooperates together with rollers 12 and 12 in forming a pressure device 9 of a loading cam type.

The pressure device 9, in accordance with the rotation of the input shaft 15, rotates the input-side disk 2 while it is pressing against the input-side disk 2 toward the output-side disk 4. An output gear 18 is connected to the output-side disk 4 by keys 19 and 19, so that the output-side disk 4 and output gear 18 can be rotated synchronously with each other.

A pair of trunnions 6 and 6, in particular, their respective two end portions thereof are supported on a pair of support plates (not shown) in such a manner that they can be swung and can be displaced in the axial direction (in FIG. 1 in the front and back direction) thereof. And, two displacement shafts 7 and 7 are respectively supported in circular holes (not shown) portions which are respectively formed in the middle portions of the pair of trunnions 6 and 6. The two displacement shafts 7 and 7 respectively include support shaft portions 21, 21 and pivot shaft portions 22, 22 which are extend in parallel to each other but are eccentric to each other. The support shaft portions 21 and 21 are rotatably supported inside the circular holes through needle bearings (not shown), respectively. Also, power rollers 8 and 8 are rotatably supported in the peripheries of the pivotal shaft portions 22 and 22 through another needle bearings 25 and 25, respectively.

By the way, the pair of displacement shafts 7 and 7 are respectively located on 180 deg.-separated opposite sides with respect to the input shaft 15. Also, a direction, -in which the pivot shaft portions 22 and 22 of the displacement shafts 7 and 7 are eccentric to the support shaft portions 21 and 21, is set as the same direction with respect to the rotation direction of the input- and output-side disks 2 and 4. Also, the eccentric direction is set almost at right angles to the direction in which the output shaft is disposed. Therefore, the power rollers 8 and 8 are supported in such a manner that they can be somewhat displaced in the disposing direction of the input shaft 15. As a result of this, even when the power rollers 8 and 8 are displaced in the axial direction of the input shaft 15 owing to the dimensional precision of the components, elastic deformation thereof and the like, the displaced conditions of the power rollers 8 and 8 can be absorbed without applying excessive forces to the components.

Also, between the outer surfaces of the power rollers 8, 8 and the inner surfaces of the middle portions of the two trunnions 6, 6, there are interposed thrust ball bearings 26, 26 and thrust needle bearings 27, 27. The thrust ball bearings 26 and 26 are respectively used to allow the power rollers 8 and 8 to rotate while supporting the loads applied to the power rollers 8 and 8 in the thrust direction. The thrust ball bearings 26 and 26 are respectively composed of a plurality of balls 29, 29, - - - , annular-shaped retainers 28, 28 for retaining the balls 29, 29 in a freely rollable manner, and annular-shaped outer races 30, 30. The inner raceways of the thrust ball bearings 26, 26 are respectively formed on the outer surfaces of the two power rollers 8, 8, whereas the outer raceways thereof are respectively formed on the inner surfaces of the outer rings 30, 30.

The thrust needle bearings 27 and 27 are respectively composed of races 31, retainers 32 and needle rollers 33, 33. The races 31 and retainers 32 (see FIG. 9) are combined together in such a manner that they can be somewhat displaced in the rotation direction. Also, the races 31 and retainers 32 respectively include annular portions (not shown) with the pivot shaft portions 22 as the centers thereof, and projecting portions (not shown) which respectively project from the partial outer peripheral edges of their associated circular portions outwardly in the diameter direction thereof.

Figure 4:
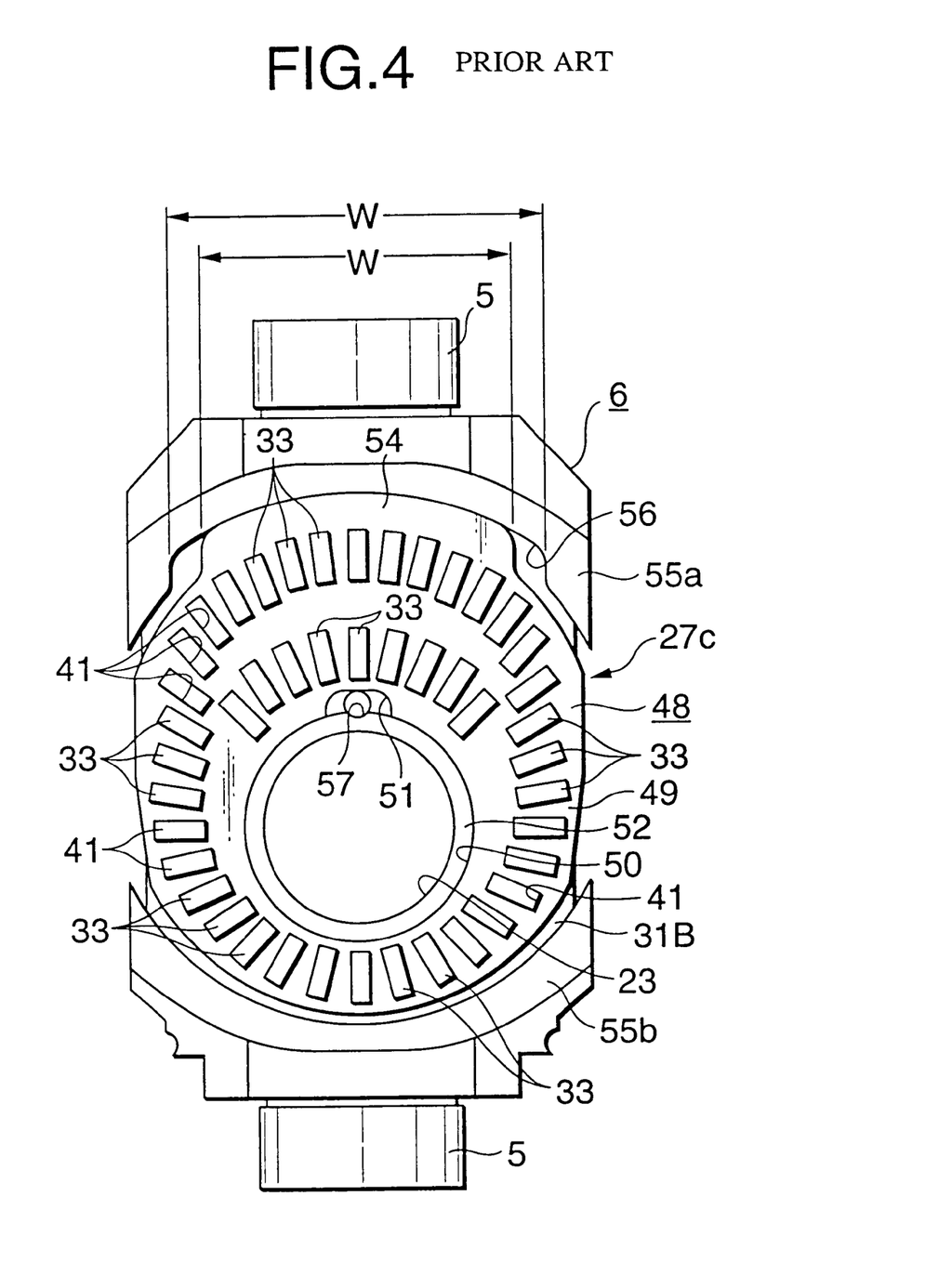
FIG. 4 is an inner side surface view of a trunnion with a thrust needle bearing assembled thereto, showing a neural state thereof.
Figure 5:
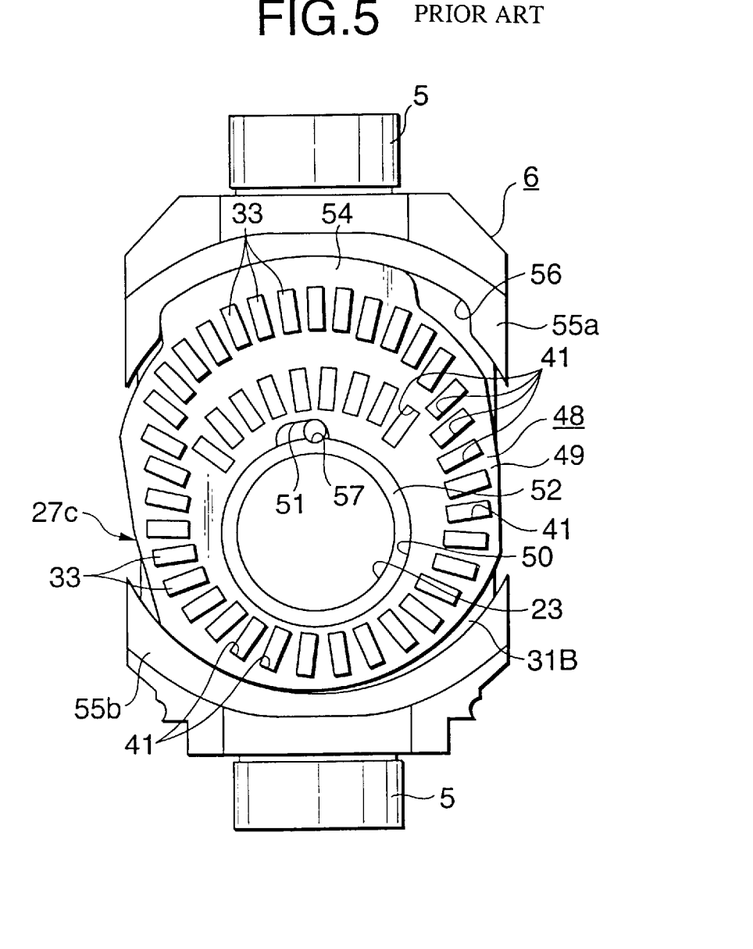
FIG. 5 is an inner side surface view of the above trunnion with a thrust needle bearing assembled thereto, showing its maximum displaced state thereof.

Now, FIGS. 4 and 5 are respectively inner surface views of a trunnion to which a thrust needle bearing according to the invention set forth in U.S. Pat. No. 5,720,689 is assembled. In particular, FIG. 4 shows a neutral state of the trunnion and FIG. 5 shows the maximum displaced state thereof. The present invention is characterized in that, in order to prevent needle rollers 33, 33 forming a thrust needle bearing 27c from protruding from a race 31B which is so disposed on the inner surface of a trunnion 6 as not to protrude from this inner surface of the trunnion 6, there is formed an uneven-shaped securing portion (which is composed of a projecting portion 54 and a recessed portion 56) between the retainer 48 and trunnion 6.

The retainer 48 can be produced by forming a plurality of rectangular-shaped pockets 41, 41, - - - , in a base plate 49 made of a metal plate, synthetic resin plate, or the like. Also, in a portion of the base plate 49 which is shifted to one side in the longitudinal direction thereof from the center thereof, there are formed a circular hole 50 and a cutaway portion 51 which projects from part of the circular hole 50 outwardly in the diameter direction thereof. A projecting member 52, which is formed on the inner surface of the trunnion 51, is rotatably fitted into the circular hole 50 with no play between them.

In the trunnion 6, there is formed another circular hole 23 through which the support shaft portion 21 of the displacement shaft 7 can be inserted, while one end of the circular hole 23 is open to the inside of the projecting member 52. In a state where the circular hole 50 is fitted over the projecting member 52, the longitudinal direction of the respective pocket holes (roller grooves) 41 formed in the base plate 49 of the retainer 48 is consistent with a radial direction with the circular hole 50 as the center thereof. Therefore, the axial direction of all the needle rollers 33 forming the thrust needle bearing 27c is consistent with a radial direction the center of which is the support shaft portion 21 that is inserted into the circular hole 23. By the way, in FIGS. 4 and 5, reference characters 55a and 55b respectively designate folded portions.

Figure 6:
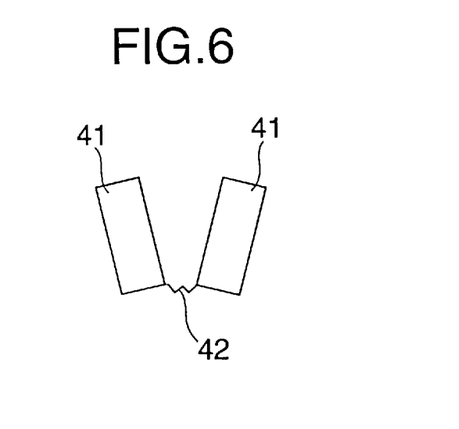
FIG. 6 is an explanatory view of a crack caused in a retainer being one of the elements of a related toroidal type continuously variable transmission.

However, in the above-mentioned related continuously variable transmission, the retainer 48, similarly to an ordinary thrust needle bearing, has a thickness of the order of 0.5 mm and thus it cannot satisfy the required conditions on the hardness and hardened layer depth to a satisfactory degree; and, therefore, as shown in FIG. 6, there can be caused a crack 42 in the portion of the retainer 48 that is the center portion side between the roller grooves 41, 41 into which the needle rollers 33, 33 can be inserted.

In this connection, to increase the capacity for the thrust load, the number of needle rollers must be increased; and, if the number of needle rollers is increased, then the width t (see FIG. 7C) of a retainer pillar between the roller grooves is decreased and thus the strength thereof is lowered. Also, if the width t is excessively small, then it is impossible to manufacture the retainer 48 by press working.

SUMMARY OF THE INVENTION

The present invention aims at eliminating the above-mentioned drawbacks found in the related toroidal type continuously variable transmission. Accordingly, it is an object of the invention to provide a toroidal type continuously variable transmission in which a retainer for retaining a thrust needle roller in a freely rollable manner is formed of a single plate, and the retainer is carbonitrided and the surface hardness Hv of the retainer is set higher than or equal to 550, whereby not only the strength of the retainer itself is increased to thereby satisfy the required thrust load capacity and durability at the same time but also the retainer can be protected against damage.

In attaining the above object, according to the invention, there is provided a toroidal type continuously variable transmission, including: first and second disks concentrically disposed on each other and rotatably supported about a mutual central axis, the first and second disks respectively having circularly concave surfaces, which are opposed to each other; a trunnion swingable about a pivot shaft situated at a torsional position with respect to the center axis of the first and second disks; a displacement shaft including a support shaft portion and a pivot shaft portion that are parallel and eccentric to each other, the displacement shafts being rotatably supported on the trunnion through the support shaft portion, the pivot shaft portion being projected from an inner surface of the trunnion; a power roller nipped between the first and second disks in such a manner as to be rotatably supported on the periphery of the pivot shaft portion, the peripheral surface of the power roller having a circular convex surface contactable with the circularly concave surfaces of the first and second disks; a thrust ball bearing disposed for bearing thrust load exerted on the power roller and allowing the power roller to rotate, the thrust ball bearing having an outer ring; and, a thrust needle bearing interposed between the outer ring of the thrust ball bearings and the trunnions, for bearing thrust lead exerted on the outer ring of the thrust ball bearing by the power roller and allowing the outer ring of the thrust ball bearing to swing about the support shaft portion, the thrust needle bearing being provided with a thrust needle roller and a retainer rollably retaining the thrust needle roller, wherein the retainer of the thrust needle bearing is of a single plate, is carbonitrided, and has the surface hardness Hv of 550 or more.

The present inventors have studied the related toroidal type continuously variable transmission from various viewpoints. And the inventors have found that, if the retainer is made of a single plate and the single-plate retainer is carbonitrided, then not only the strength of the retainer can be enhanced but also the required thrust load capacity and durability can be satisfied at the same time. On the other hand, if the hardness of the retainer obtained by quenching is insufficient, then there is a fear that the contact portions between the needle rollers and retainer are worn and there is possibly caused a crack in the pillar portion of the retainer between the roller grooves, so that the retainer is possibly damaged or broken at such crack-caused pillar portion.

Figure 10:
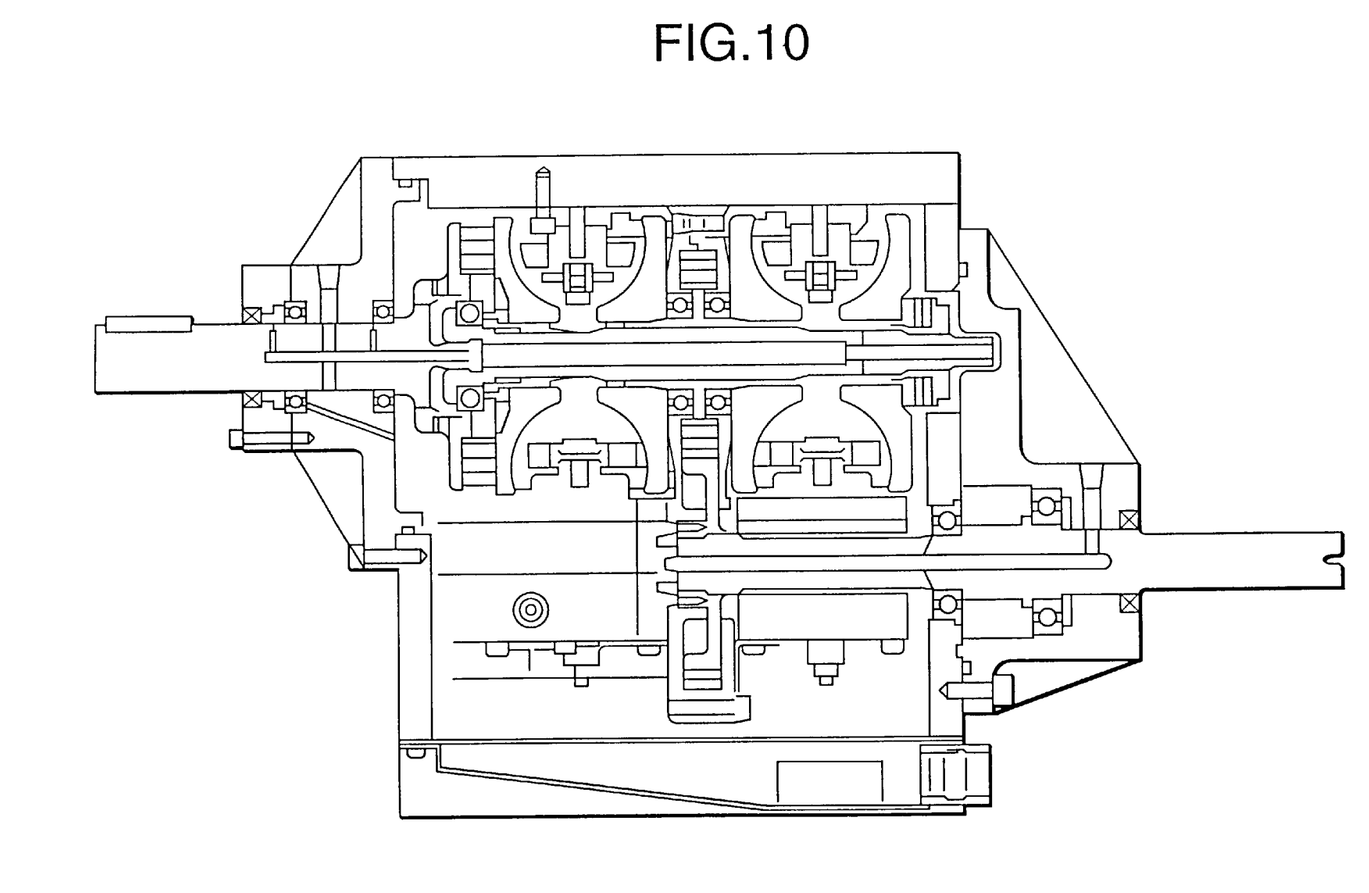
FIG. 10 is a schematic side view of a test machine in which a toroidal type continuously variable transmission is stored in the box-type case.

In view of this, the present inventors have conducted various tests using a test machine shown in FIG. 10, in which the toroidal type continuously variable transmission was stored in a box-type case, and have found that, if the surface hardness Hv of the retainer is 550 or higher, then the satisfactory hardness can be obtained, that is, the retainer can be prevented against damage.

A thrust needle bearing, which is used as a power roller backup bearing for a toroidal type continuously variable transmission, does not rotate at such a high speed as an ordinary thrust bearing but is only allowed to swing when a pivot shaft swings. However, depending on the early assembling stage thereof, when the thrust needle bearing swings, there is a possibility that, when the stopper portion of the retainer is contacted with the stopper portion of its associated trunnion and the retainer is thereby prevented from swinging any further, then a large swing torque can be applied to the retainer. Therefore, the present retainer is required to be higher in strength than the retainer of the ordinary thrust needle bearing.

Accordingly, while the ordinary thrust needle bearing uses a material having a carbon content of 0.05% or lower (for example, SPCC), according to the invention, preferably, the thrust needle bearing may use a material having a carbon content of 0.1% or higher in order to be able to obtain the required core portion hardness.

Also, while the ordinary thrust needle bearing uses a retainer which is made of a combination of two plates, according to the invention, preferably, the thrust needle bearing may use a retainer made of a single plate in order to be able to secure the required strength, and the thickness of the plate may be higher than or equal to 80% of the diameter of a needle roller in order to be able to secure a sufficient strength.

Figure 9:
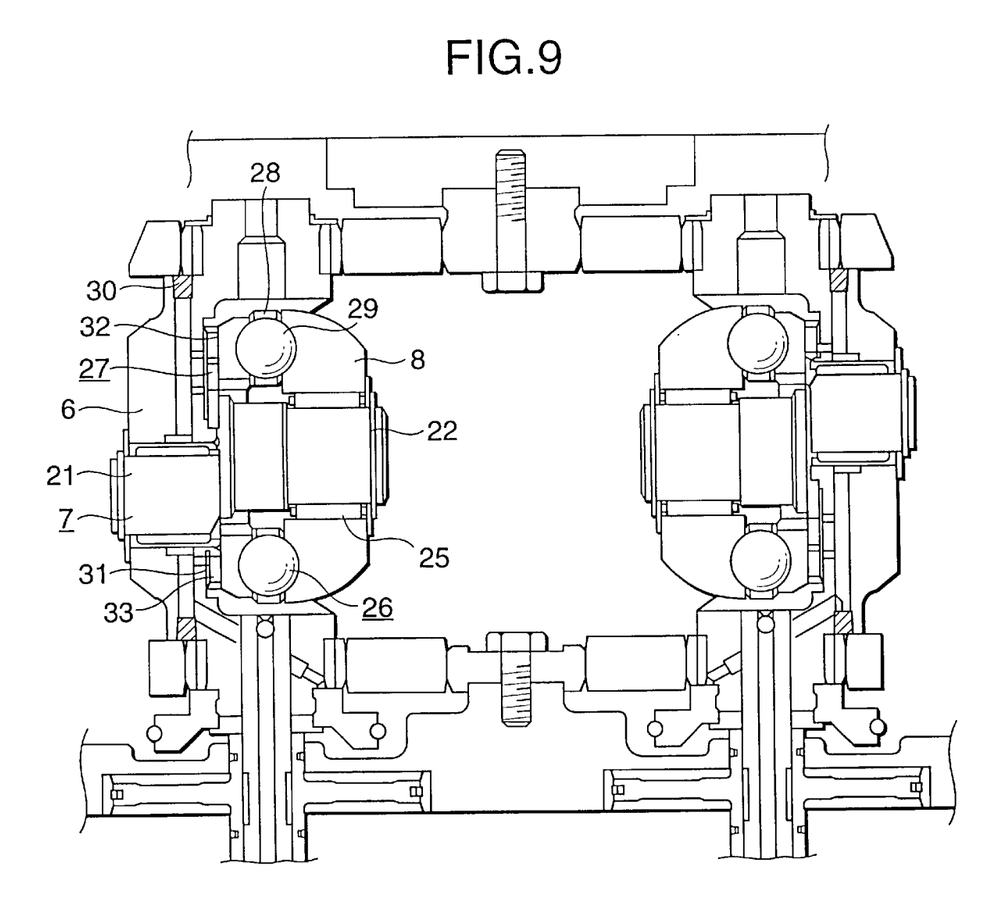
FIG. 9 is an explanatory view of an assembled state in which a thrust needle bearing, a pivot shaft, and power rollers are assembled to a trunnion.

The test data, which show the above-mentioned our discoveries, are as shown in Tables 2 and 3 which will be discussed hereinafter. All of the test data are obtained through our tests which were conducted in such a manner that, as shown in FIG. 9, after the thrust needle bearings, pivot shafts, and power rollers were assembled to the trunnions, pressure was applied to the power rollers to thereby cause the power rollers to swing.

Incidentally, the center lines of the respective bearing needle rollers are all focused on a certain point, and this point corresponds to the axis of the pivot shaft on the trunnion side thereof. Also, the bearing needle rollers back up at least 70% of the PCD of the thrust needle bearing.

DETAILED DESCRIPTION OF THE PREFERRED EMBODIMENTS

Figure 7A:
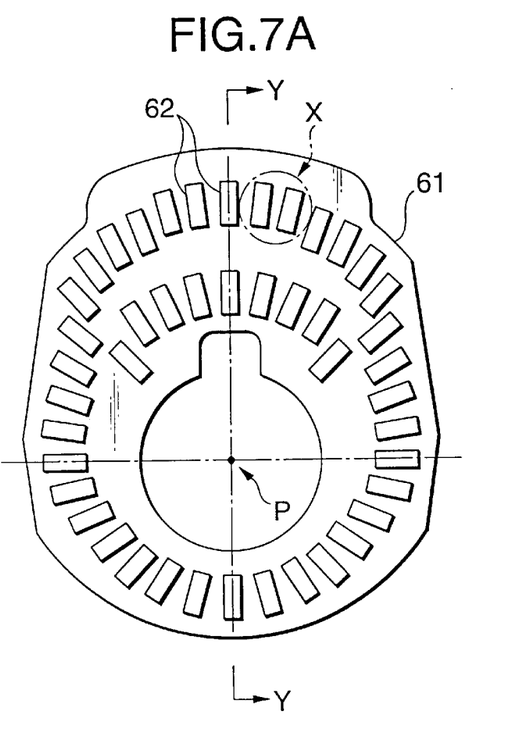
FIGS. 7A to 7C are explanatory views of a retainer being one of the elements of a toroidal type continuously variable transmission according to the invention.
Figure 7B:
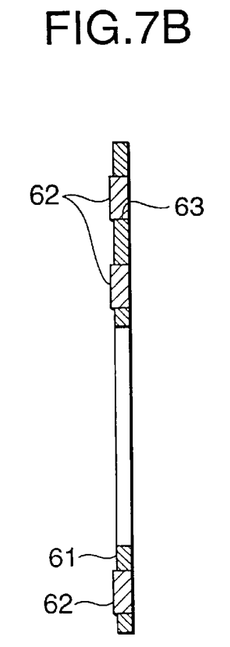
Figure 7C:
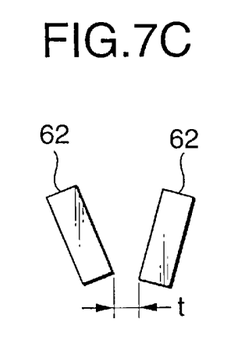

Now, description will be given below of an embodiment of a toroidal type continuously variable transmission according to the invention with reference to FIGS. 7A to 7C. In particular, FIG. 7A is a plan view of a retainer which is a component of the present toroidal type continuously variable transmission, FIG. 7B is a section view taken along the line Y—Y shown in FIG. 7A, and FIG. 7C is an enlarged view of a main portion X of the toroidal type continuously variable transmission shown in FIG. 7A. Incidentally, the basic structure of the present toroidal type continuously variable transmission is the same as that of the related toroidal type continuously variable transmission previously described with reference to FIGS. 1 to 3 and thus the description of only the main portion thereof will be given below.

Figure 8:
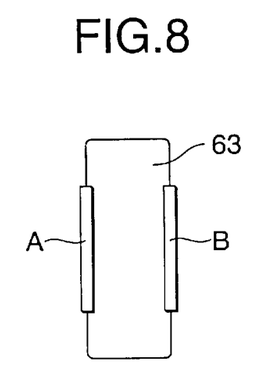
FIG. 8 is an explanatory view of a roller groove formed in the retainer shown in FIG. 7, showing how to caulk the roller.

That is, a toroidal type continuously variable transmission according to the present embodiment is characterized by a retainer which satisfies the following three conditions (1) to (3). In FIGS. 7A to 7C, reference character 61 designates a retainer and, in the outer peripheral portion of the retainer 61, there are formed a plurality of long and narrow roller grooves 63 into which a plurality of needle rollers 62 can be stored respectively. The center lines of the roller grooves 63 are arranged in such a manner that they are focused on a point P. In addition, as shown in FIG. 8, the needle rollers 62 are retained in a state that the needle rollers 62 are staked by means of portions A and B of the roller groove 63.

(1) The retainer is made of a single plate and the thickness of the plate is greater than or equal to 80% of the diameter of the roller.

The plate thickness of the retainer according to the present embodiment is, for example, of 2.2 mm (the hardened layer depth is of 0.09 mm or more).

(2) As the material of the retainer, there is used steel which has a C content of 0.1% or more.

(3) The retainer is carbonitrided, and the surface hardness Hv thereof is 550 or more and the core portion hardness Hv thereof is in the range of 350 to 500.

In fact, the inventors conducted an experiment on the retainer material while varying the surface hardness Hv; specifically, as shown in FIG. 10, there was used a test machine in which the toroidal type continuously variable transmission was stored in a box-type case, and a load equivalent to the load that is applied to an actual vehicle was applied to the toroidal type continuously variable transmission. From this experiment, there are obtained the results shown in Table 1. Table 1 shows that good results can be obtained when the surface hardness Hv is 550 or higher.

TABLE 1

| Surface Hardness Hv | Experiment Results | Judgment |
|---|---|---|
| 450 | Retainer was broken at 92 H. | X |
| 500 | Roller groove was worn greatly after 147 H operation. | X |
| 550 | Target hour, 200 H was cleared. | ○ |
| 650 | Target hour, 200 H was cleared. | ○ |

Also, a swing durability test was conducted on the thrust needle bearing while changing the density or content of carbon (C) of the retainer, heat treatment conditions thereof, surface hardness thereof, and core portion hardness thereof variously. From this test, there are obtained the results that are shown in Table 2. Table 2 shows that good results can be obtained only in the bearings No. 3 to No. 6 which respectively have a C content of 0.13%, the surface hardness Hv of 642 or higher, and the core portion hardness Hv of 376 or higher.

Further, the durability test of the thrust needle bearing was conducted while changing the plate thickness of the retainer. In this test, the retainers of No. 3 or No. 4 in Table 2 were used. The results of this test are shown in Table 3. Table 3 shows that good results can be obtained only in the bearings No. 4 and No. 5 in which the plate thickness of the retainer is 80% or more of the needle roller diameter (d=3 mm).

TABLE 3

| No | Plate thickness | Test results | Judgment |
|---|---|---|---|
| 1 | 1.0 | Broken after swung $3.1 \times 10^2$ times. | X |
| 2 | 1.5 | Broken after swung $2.4 \times 10^5$ times. | X |
| 3 | 2.0 | Broken after swung $6.7 \times 10^5$ times. | X |
| 4 | 2.5 | No damage after swung $10^7$ times. | ○ |
| 5 | 2.7 | No damage after swung $10^7$ times. | ○ | where the needle roller diameter (d) = 3 mm, the retainer material: SCM420 (C density 0.2%), and the heat treatment: carboniriding.

TABLE 2

| No | Material | C density (%) | heat treatment | Surface hardness Hv | Core portion hardness Hv | Test Results | Judgment |
|---|---|---|---|---|---|---|---|
| 1 | SPCC | 0.05 | Carboniriding | 582 | 284 | Broken after swung $4.9 \times 10^5$ times. | X |
| 2 | S10c | 0.08 | Carboniriding | 625 | 318 | Broken after swung $9.2 \times 10^5$ times. | X |
| 3 | SCM415 | 0.13 | Carboniriding | 642 | 376 | No damage after swung $10^7$ times. | ○ |
| 4 | SCM415 | 0.17 | Carboniriding | 685 | 389 | No damage after swung $10^7$ times. | ○ |
| 5 | SCM420 | 0.20 | Carboniriding | 654 | 397 | No damage after swung $10^7$ times. | ○ |
| 6 | SCM420 | 0.22 | Carboniriding | 675 | 481 | No damage after swung $10^7$ times. | ○ |
| 7 | S45C | 0.45 | refining | 298 | 288 | Broken after swung $1.9 \times 10^2$ times. | X | where the needle roller diameter (d) = 3 mm, and the holder thickness = 2.5 mm.

As described above, according to the present embodiment, the retainer 61 is made of a single plate, the plate thickness is set 80% or more of the needle roller diameter, there is used steel that contains a carbon content of 0.1% or more, and the material is carbonitrided to thereby provide the surface hardness of 550 or higher and the core portion hardness Hv in the range of 350 to 500. Then it is possible not only to satisfy the required thrust load capacity and durability at the same time but also to prevent the retainer against damage.

On the other hand, in the related retainer, if an input torque becomes larger, then the trunnion is elastically deformed so that the thrust force cannot be supported uniformly by all the needle rollers. Therefore, the clearance between the needle rollers must be narrowed but, if a large force is applied to the needle rollers, then there is a possibility that the retainer can be broken. Also, since the loads applied to the needle rollers are large and vary greatly, skews occurring in the needle rollers can become larger locally, thereby causing the needle roller and roller groove to rub with each other, with the result that the needle roller can drop off or the retainer can be broken.

Figure 11:
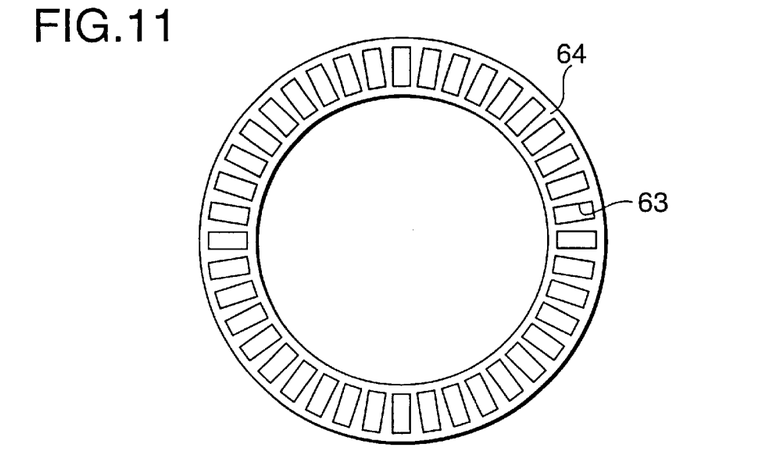
FIG. 11 is an explanatory view of a retainer according to a second embodiment of the invention; and, FIG. 12 is an inner side surface view of a trunnion to which is assembled a thrust needle bearing using the retainer shown in FIG. 11.

Next, FIG. 11 shows a second embodiment of a toroidal type continuously variable transmission according to the invention.

FIG. 11 is a plan view of a retainer 64 included in a thrust needle bearing employed in a toroidal type continuously variable transmission according to the second embodiment of the invention. The retainer 64 according to the present embodiment is formed of a single plate in an annular shape as a whole, while roller grooves 63 are formed radially at regular intervals. The remaining portions of the structure of the second embodiment are the same as those of the first embodiment and thus the description thereof is omitted here.

Figure 12:
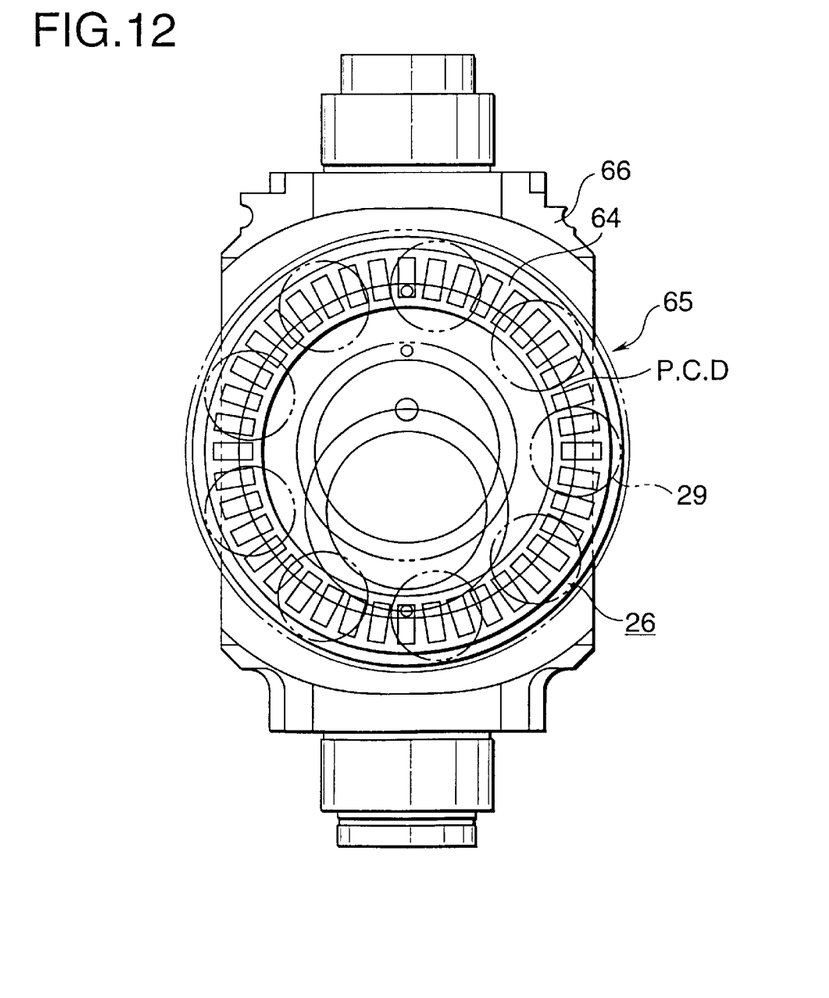

Now, FIG. 12 shows a trunnion 66 to which there is assembled a thrust needle bearing 65 using the present retainer 64. As shown in FIG. 12, the thrust needle bearing 65 backs up completely the PCD of a thrust ball bearing 26 which supports a thrust load applied to the power roller 8. Also, with this shape, the shape of the trunnion 66 can be simplified as well as the cost thereof can be reduced.

By the way, when the pivot shaft swings, since it is shifted from the center of swinging motion, there is produced a slight degree of slide between the needle roller and the outer ring of the power roller. However, because the angle of swinging motion is small, there arises no problem.

As has been described heretofore in detail, according to the invention, the retainer for retaining the thrust needle bearing in a freely rollable manner is formed of a single plate and the retainer is carbonitrided to provide the surface hardness Hv of 550 or higher. Thanks to this, there can be supplied a toroidal type continuously variable transmission in which the strength of the retainer itself can be increased, the required thrust load capacity and durability of the retainer can be satisfied at the same time, and the damage of the retainer can be prevented.

The present disclosure relates to the subject matter contained in Japanese patent application No. Hei 10-163633 filed on Jun. 11, 1998 which is expressly incorporated herein by reference in its entirety.

While only certain embodiments of the invention have between specifically described herein, it will apparent that numerous modifications may be made thereto without departing from the spirit and scope of the invention.

What is claimed is:

1. A toroidal type continuously variable transmission, comprising:

first and second disks concentrically disposed on each other and rotatably supported about a mutual central axis, said first and second disks respectively having circularly concave surfaces, which are opposed to each other;

a trunnion swingable about a pivot shaft situated at a torsional relation with respect to the center axis of said first and second disks;

a displacement shaft including a support shaft portion and a pivot shaft portion that are parallel and eccentric to each other, said displacement shaft being rotatably supported on said trunnion through said support shaft portion, said pivot shaft portion being projected from an inner surface of said trunnion;

a power roller nipped between said first and second disks in such a manner as to be rotatably supported on a periphery of said pivot shaft portion, a peripheral surface of said power roller having a circular convex surface contactable with said circularly concave surfaces of said first and second disks;

a thrust ball bearing disposed for bearing a thrust load exerted on said power roller and allowing said power roller to rotate, said thrust ball bearing having an outer ring; and a thrust needle bearing interposed between said outer ring of the thrust ball and said trunnion, for bearing a thrust load exerted on said outer ring of the thrust ball bearing by said power roller and allowing said outer ring of the thrust ball bearing to swing about said support shaft portion, said thrust needle bearing being provided with a thrust needle roller and a retainer rollably retaining said thrust needle roller, wherein said retainer of the thrust needle bearing is of a single plate, is carbonitrided, and has a surface hardness Hv of 550 or more;

wherein said retainer has a core portion hardness Hv of 350 to 500.

2. A toroidal type continuously variable transmission as set forth in claim 1, wherein a plate thickness of said retainer is more than or equal to 80% of a diameter of a needle roller employed in said thrust needle bearing.

3. The toroidal-type continuously variable transmission according to claim 1, wherein said retainer is made of a steel having a C content of 0.1% or more.

* * * * *